United States Patent
Liu et al.

(10) Patent No.: US 12,090,389 B2
(45) Date of Patent: Sep. 17, 2024

(54) VIRTUAL OBJECT CONTROL METHOD AND APPARATUS, TERMINAL, AND STORAGE MEDIUM

(71) Applicant: Tencent Technology (Shenzhen) Company Limited, Shenzhen (CN)

(72) Inventors: Zhi Hong Liu, Shenzhen (CN); Jin Hao Yang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 360 days.

(21) Appl. No.: 17/471,980

(22) Filed: Sep. 10, 2021

(65) Prior Publication Data
US 2021/0402287 A1    Dec. 30, 2021

Related U.S. Application Data

(63) Continuation of application No. PCT/CN2020/100906, filed on Jul. 8, 2020.

(30) Foreign Application Priority Data

Aug. 1, 2019 (CN) .......................... 201910707805.2

(51) Int. Cl.
*A63F 13/214* (2014.01)
*A63F 13/837* (2014.01)
*G06F 3/04883* (2022.01)

(52) U.S. Cl.
CPC .......... *A63F 13/214* (2014.09); *A63F 13/837* (2014.09); *G06F 3/04883* (2013.01)

(58) Field of Classification Search
CPC .................. A63F 13/837; A63F 13/537; A63F 2300/8076
See application file for complete search history.

(56) References Cited

U.S. PATENT DOCUMENTS 8,939,836 B2 * 1/2015 Wang .................. A63F 13/5255
463/31
9,919,213 B2 * 3/2018 Dunn .................... A63F 13/837
(Continued)

FOREIGN PATENT DOCUMENTS

CN       105498213 A    4/2016
CN       105760076 A    7/2016
(Continued)

OTHER PUBLICATIONS

ReyzGamingChannel . "PUBG How to Setup Hold to Aim Down Sights". Published Dec. 29, 2017. < https://www.youtube.com/watch?v=u45rdJa1IDA > Accessed Nov. 3, 2023 (Year: 2017).*
(Continued)

*Primary Examiner* — Seng H Lim
(74) *Attorney, Agent, or Firm* — Crowell & Moring LLP

(57) ABSTRACT

A virtual object control method includes displaying a user interface (UI) that includes a first fire button being an operation control configured to trigger to aim down sights (ADS) and fire. When a trigger signal corresponding to the first fire button is received, a virtual firearm enters an ADS state. When a fire condition is satisfied and the virtual firearm is in the ADS state, the virtual firearm can shoot. A one-tap ADS and fire capability is implemented which improves operation efficiency.

18 Claims, 10 Drawing Sheets

(56) References Cited

U.S. PATENT DOCUMENTS

| | | | |
|---|---|---|---|
| 10,183,222 B2 | 1/2019 | Tsui et al. | |
| 11,185,771 B2* | 11/2021 | Sun | A63F 13/69 |
| 2004/0266528 A1* | 12/2004 | Wang | A63F 13/212 |
| | | | 463/37 |
| 2013/0288790 A1* | 10/2013 | Wang | A63F 13/2145 |
| | | | 463/31 |
| 2013/0316821 A1* | 11/2013 | Summons | A63F 13/98 |
| | | | 463/31 |
| 2014/0274239 A1* | 9/2014 | Han | A63F 13/5372 |
| | | | 463/2 |
| 2015/0157940 A1* | 6/2015 | Hall | A63F 13/5372 |
| | | | 463/31 |
| 2015/0258441 A1* | 9/2015 | Borodovsky | A63F 13/69 |
| | | | 463/31 |
| 2016/0091282 A1* | 3/2016 | Baker | H04N 23/661 |
| | | | 348/158 |
| 2016/0377379 A1* | 12/2016 | Roman | F41G 1/473 |
| | | | 235/404 |
| 2016/0381297 A1* | 12/2016 | Alsheuski | H04N 23/635 |
| | | | 348/36 |
| 2017/0319961 A1* | 11/2017 | Dunn | A63F 13/5255 |
| 2019/0060767 A1* | 2/2019 | Shao | A63F 13/2145 |
| 2019/0076739 A1* | 3/2019 | Ge | A63F 13/537 |
| 2019/0091561 A1 | 3/2019 | Li | |
| 2019/0118089 A1* | 4/2019 | Ying | A63F 13/837 |
| 2019/0126148 A1* | 5/2019 | Wei | A63F 13/2145 |
| 2020/0306638 A1* | 10/2020 | Fear | A63F 13/67 |
| 2020/0360806 A1* | 11/2020 | Sun | A63F 13/52 |
| 2022/0134220 A1* | 5/2022 | Dang | A63F 13/837 |
| | | | 463/37 |
| 2023/0218997 A1* | 7/2023 | Deng | A63F 13/537 |
| | | | 463/31 |

FOREIGN PATENT DOCUMENTS

| | | | |
|---|---|---|---|
| CN | 106959812 A | 7/2017 | |
| CN | 107773983 A | 3/2018 | |
| CN | 108339272 A | 7/2018 | |
| CN | 109126128 A | 1/2019 | |
| CN | 109589601 A | 4/2019 | |
| CN | 110141869 A | 8/2019 | |
| CN | 110339562 A | 10/2019 | |
| JP | 2016116830 A | 6/2016 | |
| JP | 6042502 B2 | 12/2016 | |

OTHER PUBLICATIONS

"Beginners Guide to Hip Firing". Publish 2017. <https://www.reddit.com/r/CruciblePlaybook/comments/813que/beginners_guide_to_hip_firing/> Accessed Nov. 3, 2023 (Year: 2017).*

TheXclusiveAce. "Aiming Technique! Hip-fire vs. Aiming Down Sight | Improve your Aim! Part 1". Published 2015. <https://www.youtube.com/watch?v=V0XMS14mgbs> Accessed Nov. 3, 2023 (Year: 2015).*

ReyzGamingChannel . "PUBG How to Setup Hold to Aim Down Sights". Published Dec. 29, 2017. < https://www.youtube.com/watch?v=u45rdJa1IDA > Accessed Mar. 28, 2024 (Year: 2017).*

Notification of Reasons for Refusal received for Japanese Application No. 2021-550057 mailed Sep. 9, 2022 (English and Japanese languages) (12 pages).

How to Turn off Fortnite AutoFire, SMATU.net [online], Apr. 7, 2019, https://web.archive.org/web/20190407192741 , https://smatu.net/2019/03/10/fortnite-mobile-automatic-fire-setting-on-off (7 pp.).

COD Mobile—Tutorial Playthrough—Auto Fire/Auto ADS 1$^{st}$ Gameplay, YouTube [online][video], Jun. 15, 2019, https://youtube.com/wat (7 pp.).

"Let's Face the Battle!", AppBank [online], Jan. 28, 2018, https://web.archive.org/web/20180128160918; https://www.appbank.net/2014/08/09/iphone-application/868213.php (7 pp.).

"Let's Take Advantage of It!," GameWith [online], Apr. 7, 2019, https://web.archive.org/web/20190407044505, https://gamewithjp/knives-out/article/show/109698 (8 pp.).

Office Action received in related Korean Patent Application No. 10-2021-7033554, dated Jul. 19, 2023, including English translation, pp. 1-11.

COD Mobile-Tutorial Playthrough, dated Jun. 15, 2019, p. 1, available at https://www.youtube.com/watch?v=1KC9peEF6bE.

Battleground Mobile, dated May 4, 2019, p. 1, including English translation, available at https://www.youtube.com/watch?v=GHRHUzFDNPI.

Search Report for China Application No. CN 201910707805.2 mailed Oct. 21, 2022 (English and Chinese languages) (8 pages).

Search Report, dated Jan. 27, 2023, pp. 1-3, issued in Singapore Patent Application No. 11202110875S, Intellectual Property Office of Singapore.

Written Opinion, dated Jan. 30, 2023, pp. 1-6, issued in Singapore Patent Application No. 11202110875S, Intellectual Property Office of Singapore.

刺激战场: 更新了一键开镜开火, 更方便了 Title Google Translated as "Stimulate the battlefield: update one-click to open the mirror and fire, which is more convenient", dated Mar. 21, 2019, pp. 1-12, available at URL: https://www.iqiyi.com/w_19s6j5w8ch.html#curid=36225598509_47d411cd3b7ab491d2ac263c5a27b0ee.

International Search Report and Written Opinion received for Application No. PCT/CN2020/100906 mailed Oct. 12, 2020 (English and Chinese languages), (10 pages).

Japanese Office Action with English translation, dated Feb. 13, 2023, pp. 1-9, issued in Japanese Patent Application No. 2021-550057, Japanese Patent Office, Tokyo, Japan.

Shibayama Blog [online], Jan. 16, 2013, pp. 1-23, Titled: "[CoD: BO2] I actually compared the zoom magnification of the sight and scope (with image), especially the section on Assault Rifles", URL: https://shibayamablog.net/gameSee/guides/3999/ [Retrieved on Feb. 13, 2023; translation via Microsoft Word].

Korean Office Action with English translation, dated Jul. 19, 2023, pp. 1-11, issued in Korean Patent Application No. 10-2021-7033554, Korean Intellectual Property Office, Daejeon, Republic of Korea.

"COD Mobile—Tutorial Playthrough—Auto Fire / Auto ADS—1$^{st}$ Gameplay", dated Jun. 14, 2019, p. 1-2. https://www.youtube.com/watch?v=1KC9peEF6bE.

"(Battleground Mobile) Beginner Course How to change button operation location and size", dated May 3, 2019, p. 1-2. https://www.youtube.com/watch?v=GHRHUzFDNP1.

* cited by examiner

VIRTUAL OBJECT CONTROL METHOD AND APPARATUS, TERMINAL, AND STORAGE MEDIUM

RELATED APPLICATION

This application claims priority to PCT/CN2020/100906, filed on Jul. 8, 2020 and entitled "VIRTUAL OBJECT CONTROL METHOD AND APPARATUS, TERMINAL, AND STORAGE MEDIUM", which claims priority to Chinese Patent Application No. 201910707805.2, filed on Aug. 1, 2019 and entitled "VIRTUAL OBJECT CONTROL METHOD AND APPARATUS, TERMINAL, AND STORAGE MEDIUM", both of which are incorporated herein by reference in their entirety.

FIELD OF THE TECHNOLOGY

Embodiments of this application relate to the field of computer and Internet technologies, and in particular, to a virtual object control method and apparatus, a terminal, and a storage medium.

BACKGROUND OF THE DISCLOSURE

In some shooter games (STGs) on a mobile terminal, a player may control a virtual firearm held by a virtual object to shoot in a game scene provided in a game battle, to kill an enemy virtual object to win the game battle. The operations for controlling a virtual object to shoot provided in the related art may be relatively complex and inefficient.

SUMMARY

Embodiments of this application provide a virtual object control method and apparatus, a terminal, and a storage medium. According to one embodiment, a virtual object control method includes displaying a user interface (UI), the UI including a first fire button, the first fire button being an operation control configured to trigger to aim down sights (ADS) and fire; controlling, when a trigger signal corresponding to the first fire button is received, a virtual firearm held by a virtual object to enter an ADS state, the ADS state being a state of observing a virtual environment by using a virtual scope equipped on the virtual firearm; determining whether a fire condition is satisfied; and controlling, when the fire condition is satisfied and the virtual firearm is in the ADS state, the virtual firearm to shoot.

According to another embodiment, a virtual object control apparatus includes an interface display module, configured to display a UI, the UI including a first fire button, the first fire button being an operation control configured to trigger to ADS and fire; an ADS control module, configured to control, when a trigger signal corresponding to the first fire button is received, a virtual firearm held by a virtual object to enter an ADS state, the ADS state being a state of observing a virtual environment by using a virtual scope equipped on the virtual firearm; a condition detection module, configured to determine whether a fire condition is satisfied; and a shooting control module, configured to control, when the fire condition is satisfied and the virtual firearm is in the ADS state, the virtual firearm to shoot.

According to another embodiment, a mobile terminal, includes a processor and a memory, the memory storing at least one instruction, at least one program, a code set, or an instruction set, the at least one instruction, the at least one program, the code set, or the instruction set being loaded and executed by the processor to implement the virtual object control method.

According to another embodiment, a non-transitory computer-readable storage medium stores at least one instruction, at least one program, a code set, or an instruction set, the at least one instruction, the at least one program, the code set, or the instruction set being loaded and executed by a processor to implement the virtual object control method.

According to another embodiment, a computer program product, the computer program product, when run on a mobile terminal, causes the mobile terminal to perform the virtual object control method.

In the embodiments described herein, a first fire button configured to trigger to ADS and fire is designed in a UI, and when a trigger signal corresponding to the first fire button is received, a virtual firearm held by a virtual object is controlled to enter an ADS state, and the virtual firearm is controlled to shoot at the same time when the virtual firearm is in an ADS state, thereby implementing a one-tap ADS and fire capability, i.e., ADS and fire can be implemented by performing one operation, not two operations, thereby fully improving operation efficiency.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To describe objectives, technical solutions, and advantages of this application, the following describes implementations and embodiments with reference to the accompanying drawings.

Before embodiments of this application are described, a few example related terms include:

1. Virtual Object

A virtual object is a virtual character controlled by a user account in an application. For example, the application is a game application. The virtual object is a game character controlled by the user account in the game application. The virtual object may be in a human form, an animal form, a cartoon form, or another form. These are merely examples and other examples in additional embodiments are included. The virtual object may be presented in a three-dimensional form or a two-dimensional form, or in other examples in different embodiments. In different game applications, operations that can be performed by the virtual object controlled by the user account may be different. For example, in an STG application, the user account may control the virtual object to perform operations such as shooting, running, jumping, firearm picking up, firearm replacing, and bullet loading. In applications of other types, for example, an augmented reality (AR) application, a social application, or an interactive entertainment application, a virtual object may also be presented to a user and provided with a corresponding function. These are merely examples and other examples in additional embodiments are included. Virtual objects provided in different applications have different forms and corresponding functions, which may be preset according to an actual requirement.

2. Virtual Firearm

A virtual firearm is a virtual item that can simulate a real firearm to shoot. A virtual firearm may be a three-dimensional model of a real firearm, and a virtual object can carry a virtual firearm and control the virtual firearm to shoot at a target. A virtual firearm may include a plurality of different firearm categories such as a rifle, a submachine gun, a machine gun, a shotgun, and a pistol. Firearm categories may be established with reference to actual requirements. For example, rifles may be further divided into different categories such as an assault rifle and a sniper rifle, and machine guns may be further divided into different categories such as a light machine gun and a heavy machine gun.

3. Virtual Scope

A virtual scope is a virtual item equipped on a virtual firearm and configured to assist observation of a virtual environment. A virtual scope may be a three-dimensional model of a real scope. After being equipped with a virtual scope, a virtual firearm may enter an ADS state. The ADS state is a state of observing a virtual environment by using the virtual scope. A virtual scope may include sights of different magnifications (such as a 2× sight, a 3× sight, a 4× sight, a 6× sight, and an 8× sight), a laser sight, a red dot sight, a holographic sight, and the like.

Figure 1:
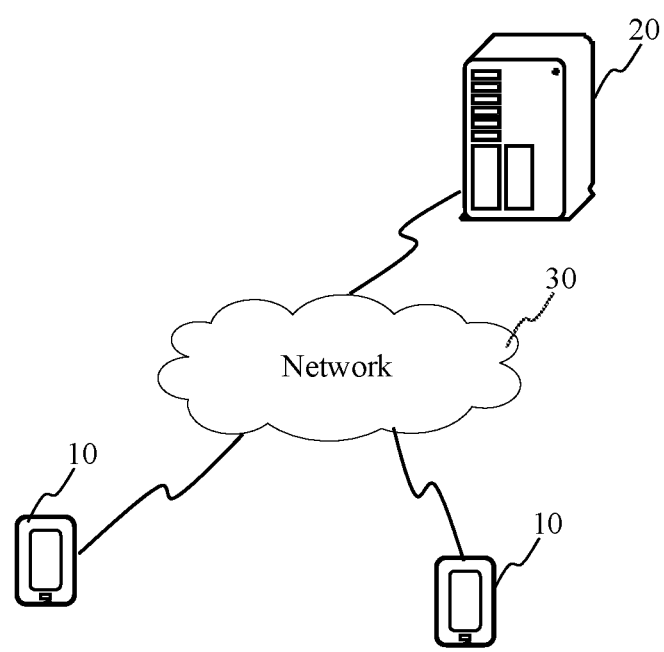
FIG. 1 is a schematic diagram of an implementation environment according to an embodiment of this application.

FIG. 1 is a schematic diagram of an implementation environment according to an embodiment of this application. The implementation environment may include a mobile terminal 10 and a server 20.

The mobile terminal 10 may be a portable electronic device such as a mobile phone, a tablet computer, a game console, an electronic book (ebook) reader, a multimedia playback device, and a wearable device. A client of a game application such as a client of an STG application may be installed on the mobile terminal 10.

The server 20 is configured to provide a backend service to the client of the application (for example, a game application) on the mobile terminal 10. For example, the server 20 may be a backend server of the application (for example, the game application). The server 20 may be one server, a server cluster including a plurality of servers, or a cloud computing service center.

The mobile terminal 10 and the server 20 may communicate with each other through a network 30. The network 30 may be a wired network or a wireless network.

Figure 2:
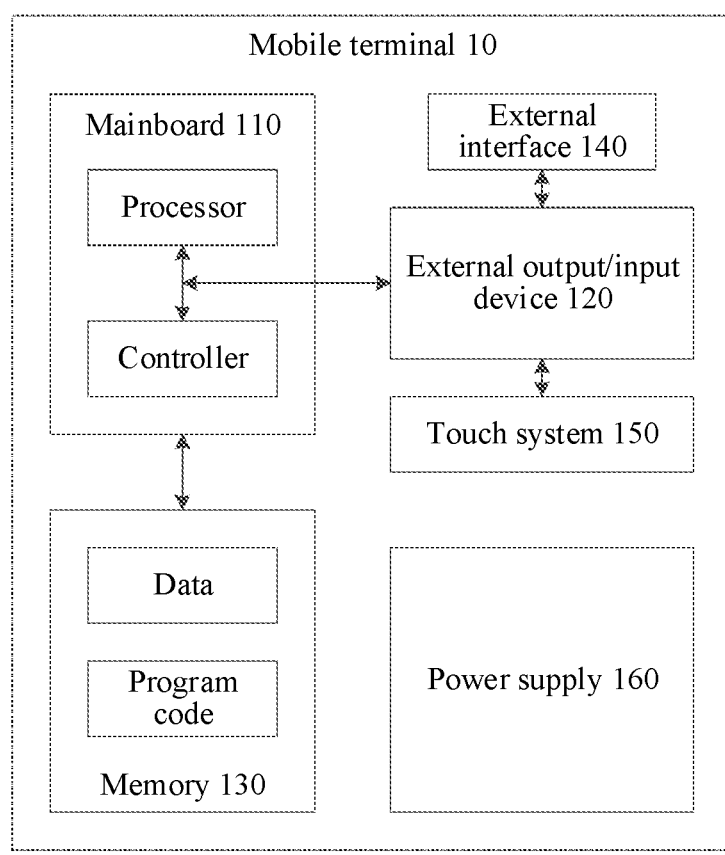
FIG. 2 is a schematic structural diagram of a mobile terminal according to an embodiment of this application.

Steps in method embodiments may be performed by the mobile terminal. FIG. 2 is a schematic structural diagram of a mobile terminal according to an embodiment of this application. The mobile terminal 10 may include a mainboard 110, an external output/input device 120, a memory 130, an external interface 140, a touch system 150, and a power supply 160.

Processing elements such as a processor and a controller are integrated in the mainboard 110.

The external output/input device 120 may include a display component (for example, a display screen), a sound playback component (for example, a speaker), a sound collecting component (for example, a microphone), and various buttons.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the mobile terminal 10.

In this embodiment of this application, the processor in the mainboard 110 may generate a UI (for example, a game interface) by executing or calling the program code and the data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

In the related art, a UI of an STG is provided with an ADS button and a fire button. After tapping an ADS button, a user may control a virtual firearm held by a virtual object to enter an ADS state. In the ADS state, a player can observe a virtual environment by using a virtual scope equipped on the virtual firearm. After tapping a fire button, a user may control a virtual firearm held by a virtual object to shoot.

In an actual application, a player has a requirement of shooting in an ADS state, so as to aim and shoot a target more accurately. However, in the related art, it may be necessary to first tap an ADS button and then tap a fire button before shooting can be implemented in an ADS state.

In the technical solutions provided in the embodiments of this application, a first fire button configured to trigger to ADS and fire is designed in a UI, and when a trigger signal corresponding to the first fire button is received, a virtual firearm held by a virtual object is controlled to enter an ADS state, and the virtual firearm is controlled to shoot at the same time when the virtual firearm is in an ADS state, thereby implementing a one-tap ADS and fire capability, i.e., ADS and fire can be implemented by performing one operation, not two operations, thereby fully improving operation efficiency.

Figure 3:
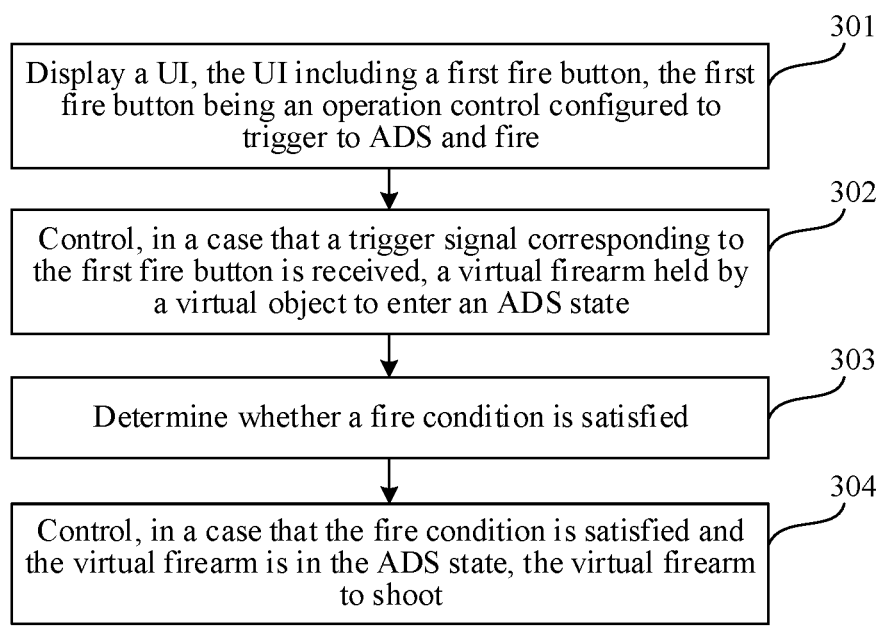
FIG. 3 is a flowchart of a virtual object control method according to an embodiment of this application.

FIG. 3 is a flowchart of a virtual object control method according to an embodiment of this application. The method is applicable to the mobile terminal described above such as a client of an application (for example, an STG application) on the mobile terminal. The method may include the following steps:

Step 301: Display a UI, the UI including a first fire button, the first fire button being an operation control configured to trigger to ADS and fire.

An STG application is used as an example. The UI may be a display interface of a game battle. The UI is configured to present a virtual environment of the game battle to a user. For example, the UI may include an element such as a virtual building, a virtual item, and a virtual object in the virtual environment. In some embodiments, the UI further includes some operation controls such as buttons, sliders, and icons for the user to operate.

Figure 4:
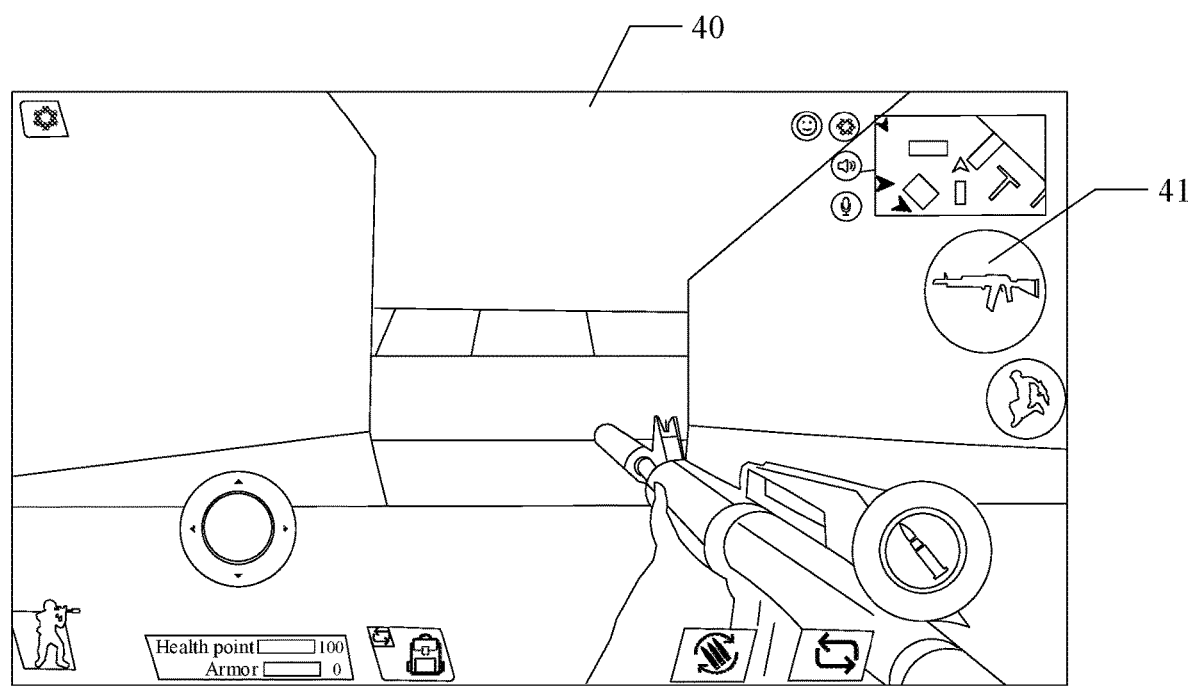
FIG. 4 is an example schematic diagram of a first fire button.

In this embodiment of this application, as shown in FIG. 4, a UI 40 includes a first fire button 41, and the first fire button 41 is an operation control configured to trigger to ADS and fire. That is, an ADS function and a fire function are integrated into the same button instead of being implemented by using two different buttons respectively, so as to implement a one-tap ADS and fire capability.

Step 302: Control, when a trigger signal corresponding to the first fire button is received, a virtual firearm held by a virtual object to enter an ADS state.

The ADS state is a state of observing a virtual environment by using a virtual scope equipped on the virtual firearm. For example, in an ADS state, a virtual scope equipped on a virtual firearm and a virtual environment seen through the virtual scope may be displayed in a UI.

In an example embodiment, the mobile terminal determines whether the trigger signal corresponding to the first fire button is received in the following manners: obtaining, when a touch operation signal is received, a touch position of the touch operation signal; obtaining a distance between the touch position and a center position of the first fire button; and determining, when the distance is less than a first threshold, that the trigger signal corresponding to the first fire button is received.

When the first fire button is circular, the first threshold may have the same radius as that of the first fire button, or may have a radius different from that of the first fire button. For example, the radius of the first threshold is slightly greater than or less than the radius of the first fire button.

When it is detected that the distance between the touch position of the touch operation signal and the center position of the first fire button is less than the first threshold, it is considered that the user taps the first fire button with a finger, and it is also determined that the trigger signal corresponding to the first fire button is received.

For example, the coordinates of the center position of the first fire button and the first threshold are configured in a configuration file, so that after a touch operation signal is received, a touch position of the touch operation signal is obtained, then the touch position is compared with the center position of the first fire button configured in the configuration file to calculate a distance between the touch position and the center position, and then the distance is compared with the first threshold to determine whether the trigger signal corresponding to the first fire button is received. The configuration file may be a configuration file in a JavaScript Object Notation (JSON) format. The coordinates of the center position of the first fire button and the first threshold are configured in the configuration file, so that a skilled person can modify the first fire button by replacing the configuration file without modifying the overall application code, making project version iteration much more convenient.

In addition, the mobile terminal may further detect whether the virtual firearm held by the virtual object supports ADS fire; and perform, when the virtual firearm supports the ADS fire and the trigger signal corresponding to the first fire button is received, the operation of controlling a virtual firearm held by a virtual object to enter an ADS state, or control, when the virtual firearm does not support the ADS fire and the trigger signal corresponding to the first fire button is received, the virtual firearm to hip fire. The hip fire is a fire manner of directly performing a shooting operation without performing an ADS operation.

In some embodiments, the mobile terminal detects whether the virtual firearm held by the virtual object supports the ADS fire by using the following steps:
  1: obtaining a firearm category to which the virtual firearm belongs;
  2: obtaining a setting option corresponding to the firearm category, the setting option being configured to set a fire manner, the fire manner including the ADS fire and hip fire; and
  3: determining, when the setting option corresponding to the firearm category is the ADS fire, that the virtual firearm supports the ADS fire.

In this embodiment of this application, a virtual firearm may include a plurality of different firearm categories such as a rifle, a submachine gun, a machine gun, a shotgun, and a pistol. A user may set a corresponding fire manner for each firearm category according to an actual requirement. For example, for a rifle, a fire manner correspondingly set by the user is the ADS fire; and for a submachine gun, a fire manner correspondingly set by the user is the hip fire.

Figure 5:
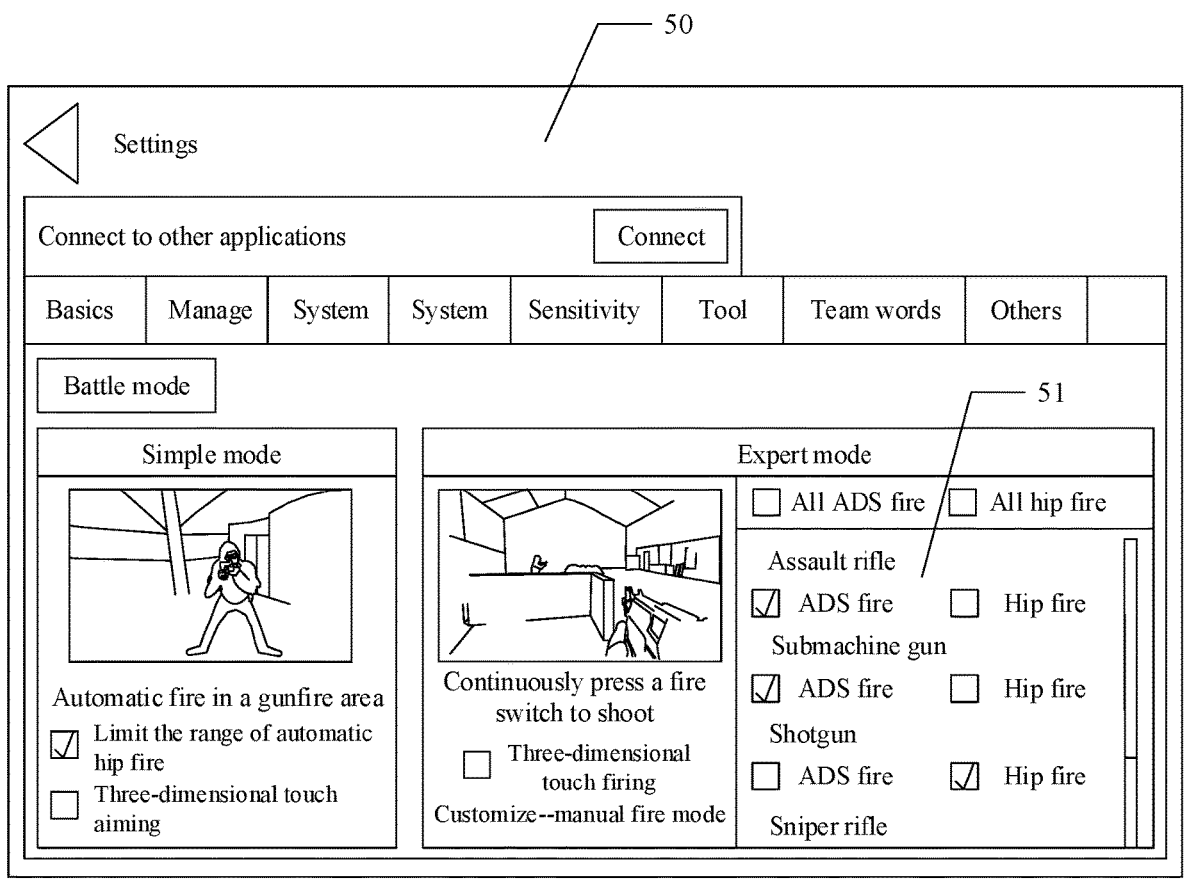
FIG. 5 is an example schematic diagram of a setting interface.

For example, as shown in FIG. 5, a plurality of different firearm categories, for example, including an assault rifle, a submachine gun, a shotgun, and a sniper rifle, are provided in a fire manner setting region 51 of a setting interface 50. For each firearm category, two setting options, that is, the ADS fire and the hip fire, are provided correspondingly. A user may set a fire manner corresponding to each firearm category flexibly according to an actual requirement. For example, as shown in FIG. 5, a fire manner corresponding to the assault rifle is set to the ADS fire, a fire manner corresponding to the submachine gun is set to the ADS fire, and a fire manner corresponding to the shotgun is set to the hip fire.

Certainly, the user may alternatively set fire manners of all the firearm categories with one key, for example, set the fire manners of all the firearm categories to the ADS fire, or set the fire manners of all the firearm categories to the hip fire.

Step 303: Detect whether a fire condition is satisfied.

After receiving the trigger signal corresponding to the first fire button, the mobile terminal further needs to detect whether a current state satisfies a fire condition. The fire condition is a preset condition that allows a virtual firearm held by a virtual object to fire and shoot.

In some embodiments, the fire condition may include a first fire condition set for the virtual object and a second fire condition set for the virtual firearm. The mobile terminal may detect whether the virtual object satisfies the first fire condition; and detect, when the virtual object satisfies the first fire condition, whether the virtual firearm satisfies the second fire condition; and determine, when the virtual firearm satisfies the second fire condition, that the fire condition is satisfied. In addition, if the virtual object does not satisfy the first fire condition or the virtual firearm does not satisfy the second fire condition, the mobile terminal determines that the fire condition is not satisfied. The foregoing two steps of detecting whether the virtual object satisfies the first fire condition and whether the virtual firearm satisfies the second fire condition may be performed successively or simultaneously in different embodiments.

In some embodiments, the detecting whether the virtual object satisfies the first fire condition includes: obtaining state information of the virtual object; and detecting, according to the state information of the virtual object, whether the virtual object satisfies the first fire condition, the first fire condition including, but not limited to, at least one of the following: the virtual object is alive, the virtual object is not driving a vehicle, and the virtual object is not in water. If the virtual object does not satisfy the first fire condition, for example, if the virtual object is dead or the virtual object is driving a vehicle, the virtual object cannot control the virtual firearm to fire. The first fire condition may be preset in one embodiment.

In some embodiments, the detecting whether the virtual firearm satisfies a second fire condition includes: obtaining state information of the virtual firearm; and detecting, according to the state information of the virtual firearm, whether the virtual firearm satisfies the second fire condition, the second fire condition including, but not limited to, at least one of the following: the virtual firearm has bullets left, and the virtual firearm is not reloading bullets. If the virtual firearm does not satisfy the second fire condition, for example, if the virtual firearm has no bullets left or the virtual firearm is reloading bullets, the virtual object cannot control the virtual firearm to fire. The second fire condition may be preset in one embodiment.

Step 304: Control, when the fire condition is satisfied and the virtual firearm is in the ADS state, the virtual firearm to shoot.

If a current state satisfies the fire condition and the virtual firearm is in the ADS state, the virtual firearm is controlled to shoot. In the foregoing manners, the user may trigger two operations of ADS and fire by tapping one button (that is, the first fire button described above) with one finger, thereby implementing a "one-tap ADS fire" function. In addition, if the current state does not satisfy the fire condition, the procedure may be ended, and the mobile terminal does not control the virtual firearm to perform a shooting operation.

An ADS button and a fire button are set in the related art, and some users may implement quick ADS and fire by using a multi-finger operating. For example, a user taps the ADS button with one finger and taps the fire button with another finger. However, the ADS button and the fire button are usually set on the same side of the UI, for example, are both set on a right side of the UI, and a joystick operation control for controlling a virtual object to move is set on a left side of the UI. Therefore, the user needs to tap the ADS button and the fire button with two fingers of one hand respectively, which is relatively difficult for the user to operate. Although the ADS button and the fire button are set on two sides of the interface, the user also needs to perform a multi-finger operation. For example, the user controls movement with one finger of the left hand, taps the ADS button with one finger of the right hand, and taps the fire button with another finger of the left hand. According to the technical solutions provided in this embodiment of this application, the user may implement two operations of ADS and fire by tapping one key with one finger, which fully reduces the operation difficulty for the user and improves the operation efficiency. In addition, advantages that a multi-finger player (for example, a three-finger player or a four-finger player) has over a two-finger player are eliminated to some extent, allowing the two-finger player to have adequate game experience.

In addition, if the virtual firearm supports continuous fire, in a duration of the trigger signal, the virtual firearm is controlled to perform a shooting operation every preset time interval. The preset time interval may be preset. For example, preset time intervals (that is, fire intervals) corresponding to different virtual firearms may be the same or different. If the virtual firearm does not support the continuous fire, the virtual firearm is controlled to perform one shooting operation in a duration of the trigger signal.

In an example embodiment, when the virtual firearm is in an ADS state, the user may further adjust a touch position corresponding to a trigger signal by moving a finger. Correspondingly, the mobile terminal obtains a touch position corresponding to the trigger signal in a duration of the trigger signal, and adjusts a shooting direction of the virtual firearm according to the touch position corresponding to the trigger signal. In some embodiments, the mobile terminal determines a relative position relationship between the touch position corresponding to the trigger signal and a center point of the first fire button, and determines a shooting direction of the virtual firearm based on the relative position relationship. For example, four directions of up, down, left, and right in the relative position relationship respectively correspond to four directions of North, South, West, and East in a virtual environment in which the virtual object is located. In this case, it is assumed that the touch position corresponding to the trigger signal is located at 45° of an upper right part of the center point of the first fire button, and the shooting direction of the virtual firearm is determined as 45° North by East. It is assumed that the touch position corresponding to the trigger signal is located at 30° of a lower left part of the center point of the first fire button, and the shooting direction of the virtual firearm is determined as 30° South by West. After determining the shooting direction of the virtual firearm, the mobile terminal may first control the virtual object to face the shooting direction, display a virtual environment within a range of a front field of view of the virtual object in the UI, and then control the virtual firearm to shoot in the shooting direction. That is, in the foregoing manner, three operations of ADS, aim, and fire are completed with one key, which fully improves the operation efficiency.

When the solutions provided in the related art are adopted, if the user wants to quickly complete three operations of ADS, aim, and fire by using a multi-finger operation, the user needs to use one finger of the left hand to control the virtual object to move, tap the ADS button with one finger of the right hand, rotate a viewing angle with another finger of the right hand to aim at an enemy virtual object, and tap the fire button with another finger of the left hand, which imposes a very high requirement on the user operation.

According to some embodiments, a joystick function is configured for the first fire button. After tapping the first fire button, the user may adjust the shooting direction of the virtual firearm by moving a finger without lifting the finger from a screen. Therefore, the user may complete three operations of ADS, aim, and fire with one finger, which fully reduces the operation difficulty for the user.

In summary, in some embodiments, a first fire button configured to trigger to ADS and fire is designed in a UI, and when a trigger signal corresponding to the first fire button is received, a virtual firearm held by a virtual object is controlled to enter an ADS state, and the virtual firearm is controlled to shoot at the same time when the virtual firearm is in an ADS state, thereby implementing a one-tap ADS and fire capability, i.e., ADS and fire can be implemented by performing one operation, not two operations, thereby fully improving operation efficiency.

In addition, in the duration of the trigger signal corresponding to the first fire button, the shooting direction of the virtual firearm can be adaptively adjusted according to a change of the touch position corresponding to the trigger signal, to implement three operations of ADS, aim, and fire with one key, thereby further improving the operation efficiency.

Figure 6:
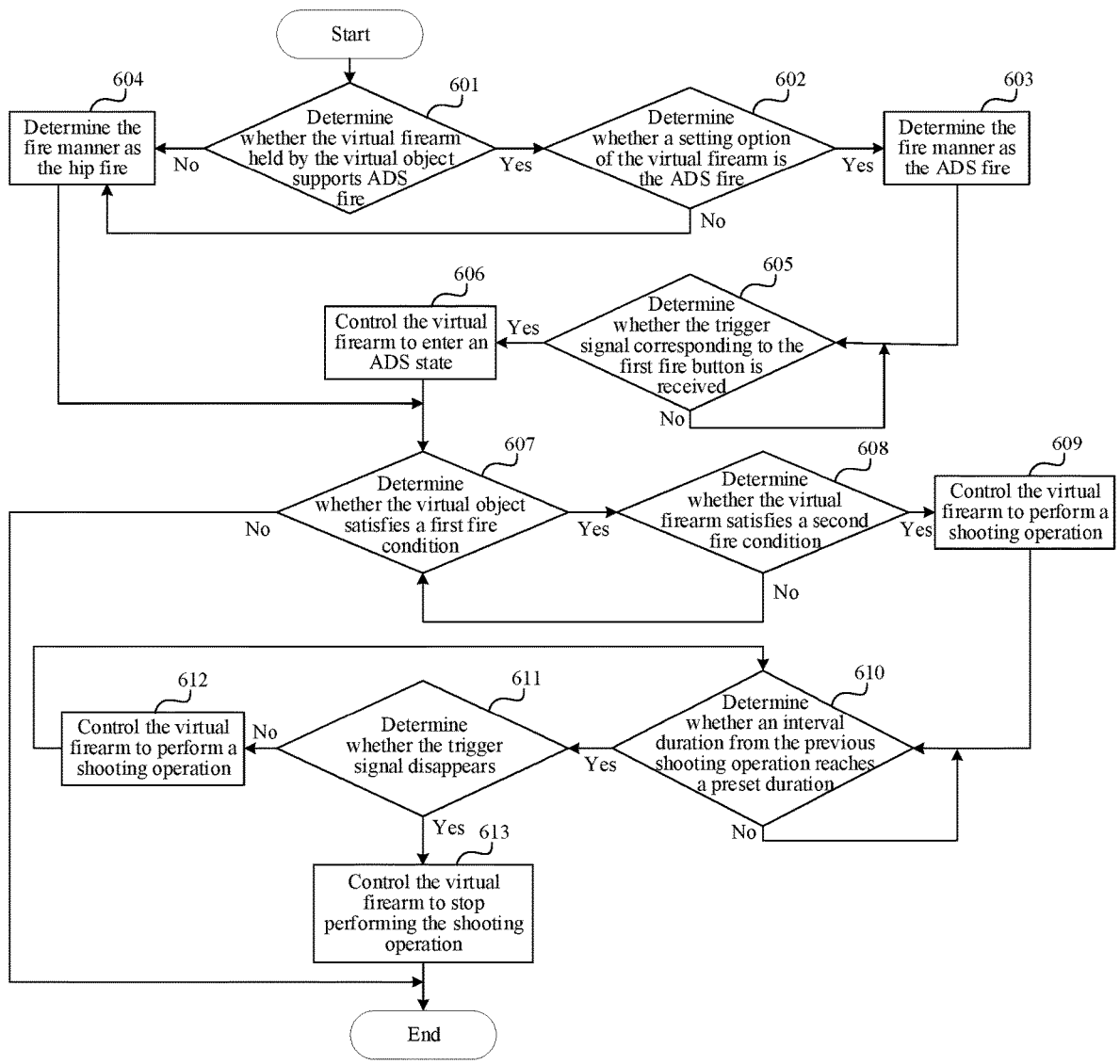
FIG. 6 is a flowchart of a virtual object control method according to another embodiment of this application.

In another example, referring to FIG. 6, the virtual object control method provided in this embodiment of this application may include the following several steps:

Step 601: Determine whether the virtual firearm held by the virtual object supports ADS fire. Step 602 is performed if the virtual firearm supports ADS fire; and step 604 is performed if the virtual firearm does not support ADS fire.

Step 602: Determine whether a setting option of the virtual firearm is the ADS fire. Step 603 is performed if the setting option of the virtual firearm is the ADS fire; and step 604 is performed if the setting option of the virtual firearm is not the ADS fire.

Step 603: Determine the fire manner as the ADS fire.

Step 604: Determine the fire manner as the hip fire.

Step 605: Determine whether the trigger signal corresponding to the first fire button is received. Step 606 is performed if the trigger signal is received, and if the trigger signal is not received, step 605 is performed.

Step 606: Control the virtual firearm to enter an ADS state.

Step 607: Determine whether the virtual object satisfies a first fire condition. Step 608 is performed if the first fire condition is satisfied; and if the first fire condition is not satisfied, the procedure is ended.

Step 608: Determine whether the virtual firearm satisfies a second fire condition. Step 609 is performed if the second fire condition is satisfied; and step 607 is performed if the second fire condition is not satisfied.

Step 609: Control the virtual firearm to perform a shooting operation.

Step 610: Determine whether an interval duration from the previous shooting operation reaches a preset duration. Step 611 is performed if the interval duration reaches the preset duration. Step 610 continues to be performed if the interval duration does not reach the preset duration.

Step 611. Determine whether the trigger signal disappears. Step 612 is performed if the trigger signal does not disappear, and step 610 is performed again after step 612. Step 613 is performed if the trigger signal disappears.

Step 612: Control the virtual firearm to perform a shooting operation.

Step 613: Control the virtual firearm to stop performing the shooting operation.

In an example embodiment, in addition to the first fire button, the UI further includes a second fire button. The second fire button is an operation control configured to trigger hip fire. The mobile terminal controls, in a case that a trigger signal corresponding to the second fire button is received, the virtual firearm held by the virtual object to hip fire.

Figure 7:
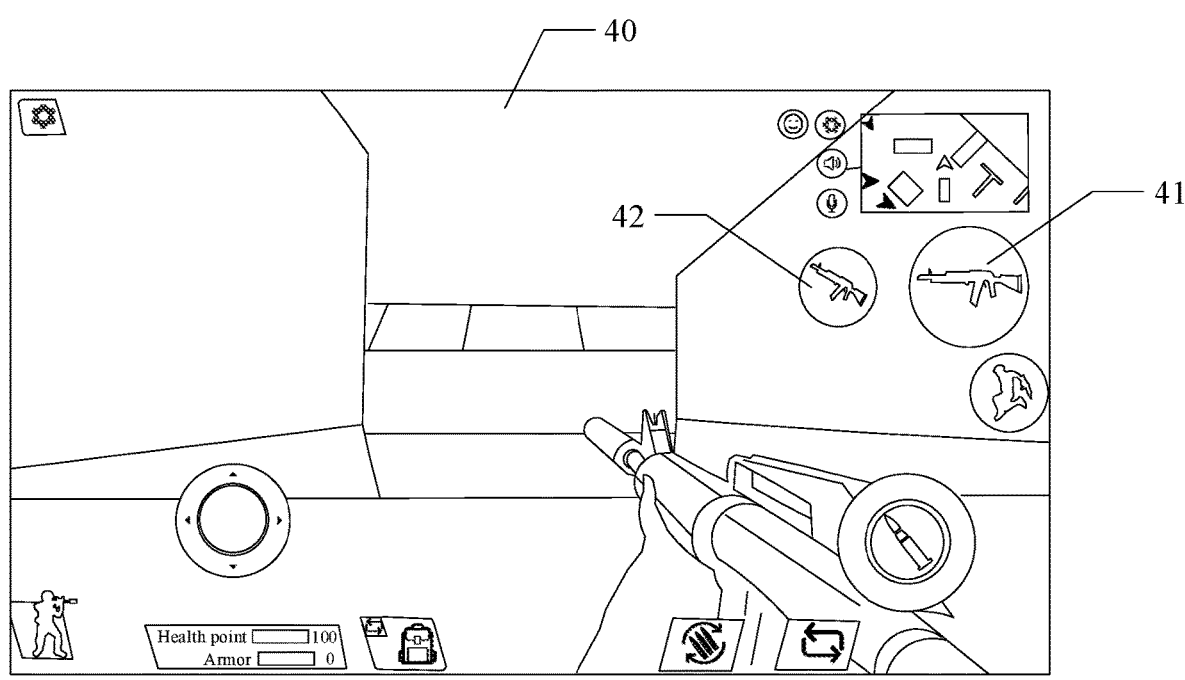
FIG. 7 is an example schematic diagram of a second fire button.

For example, as shown in FIG. 7, the UI 40 includes a first fire button 41 and a second fire button 42. The second fire button 42 may be set next to the first fire button 41, for example, set on a left side of the first fire button 41. In addition, a size of the second fire button 42 may be appropriately less than a size of the first fire button 41.

The mobile terminal may obtain, when a touch operation signal is received, a touch position of the touch operation signal; obtain a distance between the touch position of the touch operation signal and a center position of the second fire button; and determine, when the distance is less than a second threshold, that the trigger signal corresponding to the second fire button is received. When the second fire button is circular, a radius of the second threshold may be the same as that of the second fire button or may be different from that of the second fire button. For example, the radius of the second threshold is slightly greater than or slightly less than the radius of the second fire button. When it is detected that the distance between the touch position of the touch operation signal and the center position of the second fire button is less than the second threshold, it is considered that the user taps the second fire button with a finger, that is, it is determined that the trigger signal corresponding to the second fire button is received. Similarly, coordinates of the center position of the second fire button and the second threshold may be configured in the configuration file. This is merely one examples and other examples in additional embodiments are included.

In this embodiment of this application, both the first fire button and the second fire button are provided in the UI, to provide more diversified fire manners for selection by the user. The user may implement ADS fire by tapping the first fire button, and the user may implement hip fire by tapping the second fire button, which better satisfies the operation requirements of the user.

The one-tap ADS fire provides convenience for quick ADS and fight. However, in a close battle, a virtual scope needs to be displayed in the UI, which blocks the user's sight and makes it difficult to aim and fire. Therefore, the second fire button is disposed next to the first fire button, so that the foregoing deficiency can be adequately remedied. For example, in a close battle, the user may tap the second fire button to directly hip fire, so as to avoid a problem caused by ADS. However, in a battle at a medium or long distance, the user may tap the first fire button to ADS fire, so as to provide more convenient fire mechanism with additional options for selection by the user.

In addition, the display may include the first fire button only or may display both the first fire button and the second fire button in the UI. In one embodiment, this may be set by the user according to an actual requirement in one embodiment.

Figure 8:
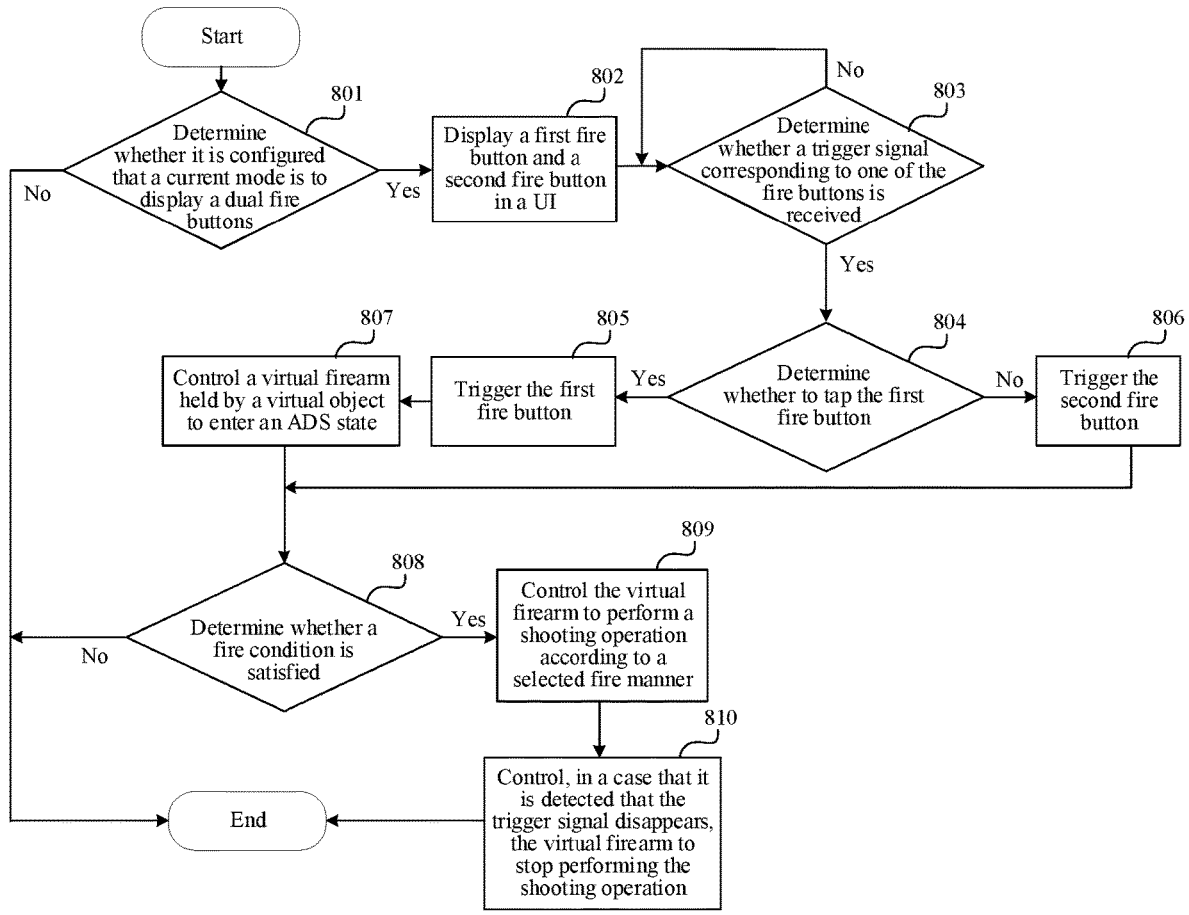
FIG. 8 is a flowchart of a virtual object control method according to another embodiment of this application.

In an example, referring to FIG. 8, the virtual object control method provided in this embodiment may include the following several steps:

Step 801: Determine whether it is configured that a current mode is to display dual fire buttons. Step 802 is performed if it is configured that a current mode is to display dual fire buttons; and the procedure is ended if a current mode is not configured to display dual fire buttons.

Step 802: Display a first fire button and a second fire button in a UI.

Step 803: Determine whether a trigger signal corresponding to one of the fire buttons is received. Step 804 is performed if the trigger signal is received; and step 803 is performed if the trigger signal is not received.

Step 804: Determine whether to tap the first fire button. Step 805 is performed if the first fire button is tapped, and step 807 is performed again after step 805. Step 806 is performed if the first fire button is not tapped.

Step 805: Trigger the first fire button.

Step 806: Trigger the second fire button.

Step 807: Control a virtual firearm held by a virtual object to enter an ADS state.

Step 808: Determine whether a fire condition is satisfied. Step 809 is performed if the fire condition is satisfied; and the procedure is ended if the fire condition is not satisfied.

Step 809: Control the virtual firearm to perform a shooting operation according to a selected fire manner.

Step 810: Control, when it is detected that the trigger signal disappears, the virtual firearm to stop performing the shooting operation.

The following is an apparatus embodiment of this application, which can be used to perform the method embodiments of this application. For details not disclosed in the apparatus embodiment of this application, reference may be made to the method embodiments of this application.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 9:
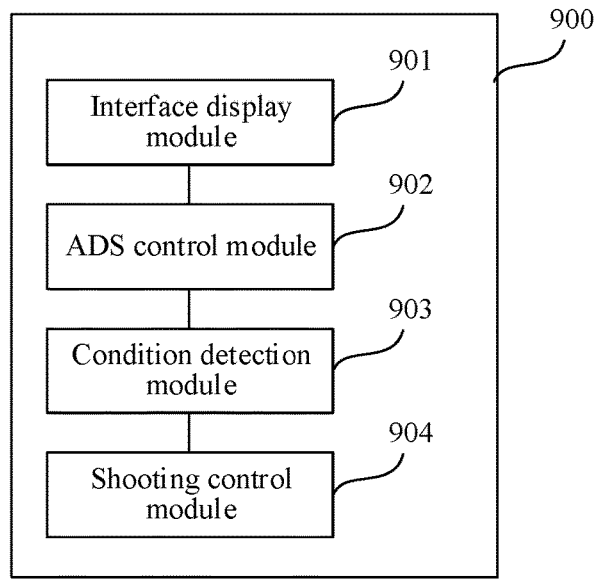
FIG. 9 is a block diagram of a virtual object control apparatus according to an embodiment of this application.

FIG. 9 is a block diagram of a virtual object control apparatus according to an embodiment of this application. The apparatus has functions of implementing the foregoing method embodiments. The functions may be implemented by hardware, or may be implemented by hardware executing corresponding software. The apparatus may be a mobile terminal or may be disposed in a mobile terminal. The apparatus 900 may include an interface display module 901, an ADS control module 902, a condition detection module 903, and a shooting control module 904.

The interface display module 901 is configured to display a UI, the UI including a first fire button, the first fire button being an operation control configured to trigger to ADS and fire.

The ADS control module 902 is configured to control, when a trigger signal corresponding to the first fire button is received, a virtual firearm held by a virtual object to enter an ADS state, the ADS state being a state of observing a virtual environment by using a virtual scope equipped on the virtual firearm;

The condition detection module 903 is configured to determine whether a fire condition is satisfied.

the shooting control module 904 is configured to control, when the fire condition is satisfied and the virtual firearm is in the ADS state, the virtual firearm to shoot.

In an example embodiment, the condition detection module 903 is configured to: determine whether the virtual object satisfies a first fire condition; detect, when the virtual object satisfies the first fire condition, whether the virtual firearm satisfies a second fire condition; and determine, when the virtual firearm satisfies the second fire condition, that the fire condition is satisfied.

In an example embodiment, the shooting control module 904 is configured to: control, in a duration of the trigger signal, the virtual firearm to perform a shooting operation every preset time interval.

Figure 10:
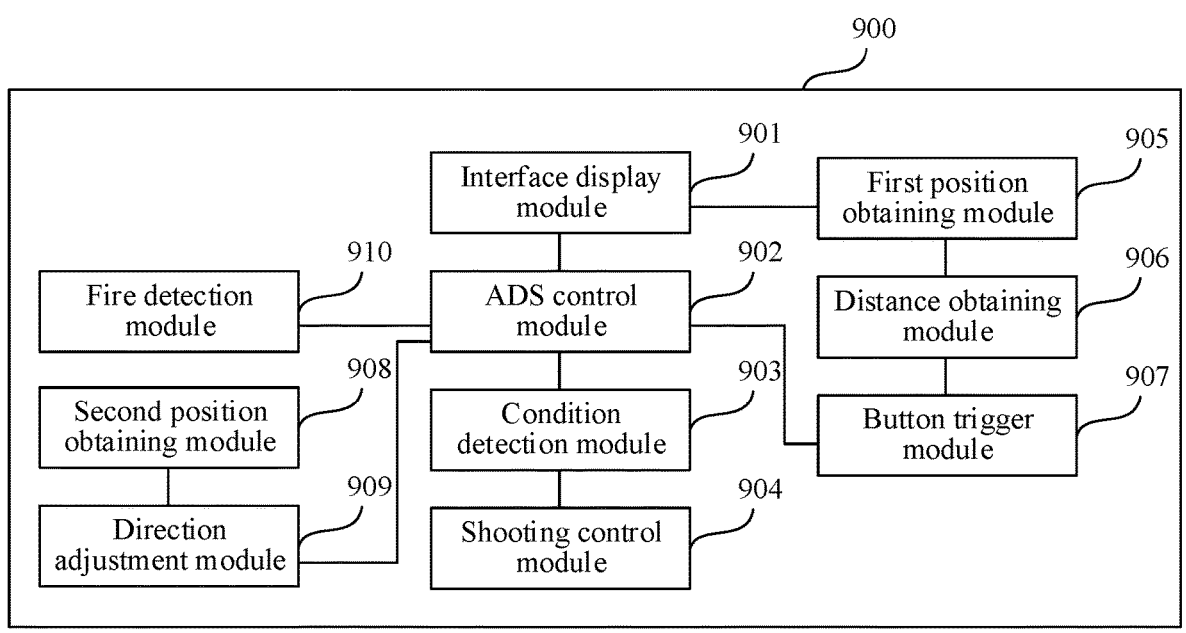
FIG. 10 is a block diagram of a virtual object control apparatus according to another embodiment of this application.

In an example embodiment, as shown in FIG. 10, the apparatus 900 further includes a first position obtaining module 905, a distance obtaining module 906, and a button trigger module 907.

The first position obtaining module 905 is configured to obtain, when a touch operation signal is received, a touch position of the touch operation signal.

The distance obtaining module 906 is configured to obtain a distance between the touch position of the touch operation signal and a center position of the first fire button.

The button trigger module 907 is configured to determine, when the distance is less than a first threshold, that the trigger signal corresponding to the first fire button is received.

In an example embodiment, as shown in FIG. 10, the apparatus 900 further includes a second position obtaining module 908 and a direction adjustment module 909.

The second position obtaining module 908 is configured to obtain a touch position corresponding to the trigger signal in a duration of the trigger signal.

The direction adjustment module 909 is configured to adjust a shooting direction of the virtual firearm according to the touch position corresponding to the trigger signal.

In an example embodiment, the UI further includes a second fire button, and the second fire button is an operation control configured to trigger hip fire.

Correspondingly, the shooting control module 904 is further configured to control, when a trigger signal corresponding to the second fire button is received, the virtual firearm held by the virtual object to hip fire.

In an example embodiment, as shown in FIG. 10, the apparatus further includes a fire detection module 910.

The fire detection module 910 is configured to detect whether the virtual firearm held by the virtual object supports ADS fire.

The ADS control module 902 is further configured to perform, when the virtual firearm supports the ADS fire and the trigger signal corresponding to the first fire button is received, the operation of controlling a virtual firearm held by a virtual object to enter an ADS state.

In an example embodiment, the fire detection module 910 is configured to:
  obtain a firearm category to which the virtual firearm belongs;
  obtain a setting option corresponding to the firearm category, the setting option being configured to set a fire manner, the fire manner including the ADS fire and hip fire; and
  determine, when the setting option corresponding to the firearm category is the ADS fire, that the virtual firearm supports the ADS fire.

In summary, in the technical solutions provided in the embodiments of this application, a first fire button configured to trigger to ADS and fire is designed in a UI, and when a trigger signal corresponding to the first fire button is received, a virtual firearm held by a virtual object is controlled to enter an ADS state, and the virtual firearm is controlled to shoot at the same time when the virtual firearm is in an ADS state, thereby implementing a one-tap ADS and fire capability, i.e., ADS and fire can be implemented by performing one operation, not two operations, thereby fully improving operation efficiency.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For one implementation process, reference may be made to the other embodiments described herein.

Figure 11:
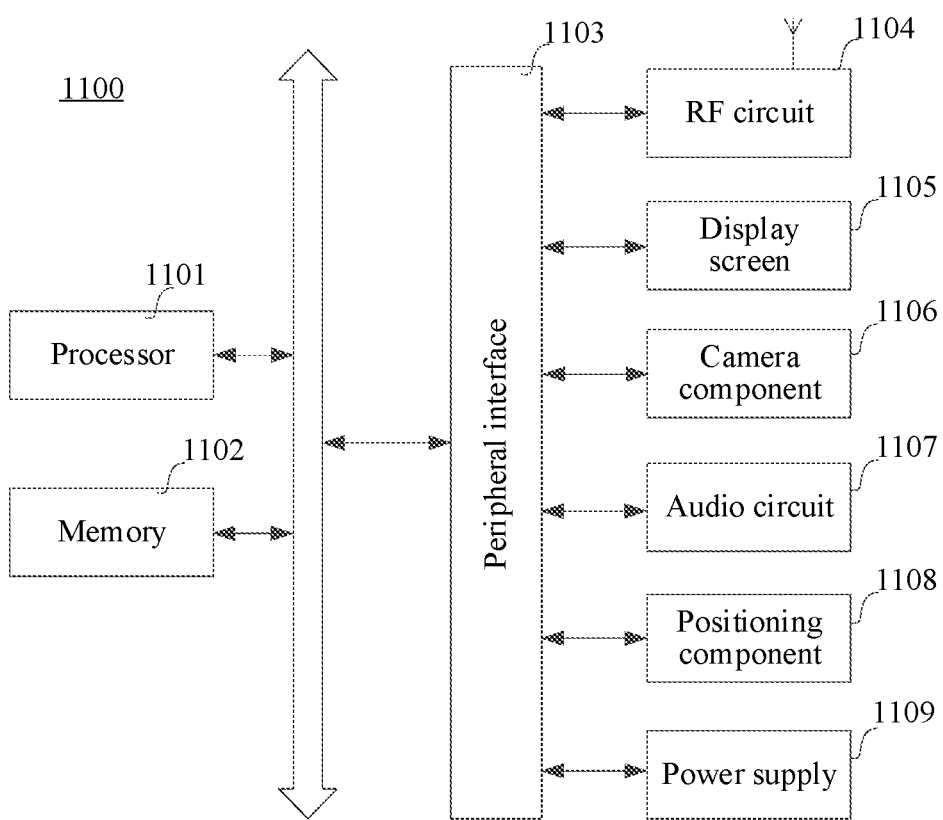
FIG. 11 is a structural block diagram of a mobile terminal according to an embodiment of this application.

FIG. 11 is a structural block diagram of a mobile terminal 1100 according to an embodiment of this application. The mobile terminal 1100 may be a portable electronic device such as a mobile phone, a tablet computer, a game console, an electronic book reader, a multimedia playback device, and a wearable device. The mobile terminal is configured to implement the virtual object control method provided in the foregoing embodiments. The mobile terminal may be the mobile terminal 10 in the implementation environment shown in FIG. 1. In some embodiments, the mobile terminal 1100 includes a processor 1101 and a memory 1102.

The processor 1101 may include one or more processing cores. For example, the processor may be a 4-core processor or an 8-core processor. The processor 1101 may be implemented by using at least one hardware form of a digital signal processor (DSP), a field programmable gate array (FPGA), and a programmable logic array (PLA). The processor 1101 may alternatively include a main processor and a coprocessor. The main processor is configured to process data in an active state, also referred to as a central processing unit (CPU). The coprocessor is a low-power processor configured to process data in a standby state. In some embodiments, the processor 1101 may be integrated with a graphics processing unit (GPU). The GPU is configured to render and draw content that needs to be displayed on a display. In some embodiments, the processor 1101 may further include an artificial intelligence (AI) processor. The AI processor is configured to process computing operations related to machine learning.

The memory 1102 may include one or more computer-readable storage media. The computer-readable storage medium may be non-transient. The memory 1102 may further include a high-speed random access memory (RAM) and a non-volatile memory, such as one or more magnetic disk storage devices or flash storage devices. In some embodiments, the non-transient computer-readable storage medium in the memory 1102 is configured to store at least one instruction, at least one program, a code set, or an instruction set, the at least one instruction, the at least one program, the code set, or the instruction set being configured to be executed by one or more processors to implement the virtual object control method.

In some embodiments, the mobile terminal 1100 may include a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. In some embodiments, the peripheral includes at least one of a radio frequency (RF) circuit 1104, a display screen 1105, a camera component 1106, an audio circuit 1107, a positioning component 1108, and a power supply 1109.

A person skilled in the art may understand that the structure shown in FIG. 11 does not constitute a limitation to the mobile terminal 1100, and the mobile terminal may include more or fewer components than those shown in the figure, or some components may be combined, or a different component arrangement may be used.

In an example embodiment, a computer-readable storage medium is further provided, storing at least one instruction, at least one program, a code set, or an instruction set, the at least one instruction, the at least one program, the code set, or the instruction set, when executed by a processor, implementing the virtual object control method.

In some embodiments, the computer-readable storage medium may include: a read-only memory (ROM), a RAM, a solid state drive (SSD), an optical disc, or the like. The RAM may include a resistive RAM (ReRAM) and a dynamic RAM (DRAM).

In an example embodiment, a computer program product is further provided, the computer program product, when executed by a processor, being used for implementing the virtual object control method.

"A plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A virtual object control method comprising:
   displaying a user interface (UI) having a first fire button configured as an operation control to trigger an aim down sights (ADS) and fire and a second fire button including configured as an operation control to trigger hip fire, the second fire button being next to the first fire button;
   in response to receiving a trigger signal corresponding to the first fire button, controlling a virtual firearm held by a virtual object to enter an ADS state, determining whether a fire condition is satisfied, and controlling the virtual firearm to shoot in response to the fire condition being satisfied and the virtual firearm being in the ADS state, wherein the ADS state is a state of observing a virtual environment by using a virtual scope for the virtual firearm; and
   in response to receiving a touch operation signal, obtaining a touch position of the touch operation signal and a distance between the touch position of the touch operation signal and a center position of the second fire button, determining that a trigger signal corresponding to the second fire button is received in response to the distance between the touch position of the touch operation signal and the center position of the second fire button being less than a second threshold, and controlling the virtual firearm held by the virtual object to hip fire in response to receiving the trigger signal corresponding to the second fire button.

2. The method according to claim 1, wherein the fire condition comprises a first fire condition and a second fire condition, and
   wherein the determining whether the fire condition is satisfied further comprises:

determining whether the virtual object satisfies the first fire condition;

in response to the virtual object satisfying the first fire condition, detecting whether the virtual firearm satisfies the second fire condition; and in response to the virtual firearm satisfying the second fire condition, determining that the fire condition is satisfied.

3. The method according to claim 2, wherein the determining whether the virtual object satisfies the first fire condition further comprises:

obtaining state information of the virtual object; and detecting, according to the state information of the virtual object, whether the virtual object satisfies the first fire condition, wherein the first fire condition comprises at least one of the following: when the virtual object is alive, when the virtual object is not driving a vehicle, or when the virtual object is not in water.

4. The method according to claim 2, wherein the detecting whether the virtual firearm satisfies the second fire condition further comprises:

obtaining state information of the virtual firearm; and detecting, according to the state information of the virtual firearm, whether the virtual firearm satisfies the second fire condition, wherein the second fire condition comprises at least one of the following: when the virtual firearm has bullets left, or when the virtual firearm is not reloading bullets.

5. The method according to claim 1, wherein the controlling the virtual firearm to shoot further comprises:

controlling, in a duration of the trigger signal, the virtual firearm to perform a shooting operation every preset time interval.

6. The method according to claim 1, further comprising:

in response to a touch operation signal being received, obtaining a touch position of the touch operation signal;

obtaining a distance between the touch position of the touch operation signal and a center position of the first fire button; and in response to the distance being less than a first threshold, determining that the trigger signal corresponding to the first fire button is received.

7. The method according to claim 1, wherein after the controlling the virtual firearm held by a virtual object to enter an ADS state, the method further comprises:

obtaining a touch position corresponding to the trigger signal in a duration of the trigger signal; and adjusting a shooting direction of the virtual firearm according to the touch position corresponding to the trigger signal.

8. The method according to claim 1, further comprising:

detecting whether the virtual firearm held by the virtual object supports ADS fire; and in response to the virtual firearm supporting the ADS fire and the trigger signal corresponding to the first fire button being received, performing an operation of controlling the virtual firearm held by the virtual object to enter the ADS state.

9. The method according to claim 8, wherein the detecting whether the virtual firearm held by the virtual object supports ADS fire comprises:

obtaining a firearm category to which the virtual firearm belongs;

obtaining a setting option corresponding to the firearm category, the setting option being configured to set a fire manner, the fire manner comprising the ADS fire and the hip fire; and in response to the setting option corresponding to the firearm category being the ADS fire, determining that the virtual firearm supports the ADS fire.

10. A mobile terminal comprising a processor and a memory, the memory storing at least one instruction, at least one program, a code set, or an instruction set, the at least one instruction, the at least one program, the code set, or the instruction set being loaded and executed by the processor to implement the virtual object control method according to claim 1.

11. A virtual object control apparatus, comprising:

a processor; and a non-transitory, computer-readable storage medium in communication with the processor and storing instructions thereon that, when executed by the processor, cause the processor to:

display on a display a user interface (UI) having a first fire button configured as an operation control to trigger an aim down sights (ADS) and fire and a second fire button configured as an operation control to trigger hip fire, the second fire button being next to the first fire button;

in response to receiving a trigger signal corresponding to the first fire button, control a virtual firearm held by a virtual object to enter an ADS state, determine whether a fire condition is satisfied, and control the virtual firearm to shoot in response to the fire condition being satisfied and the virtual firearm being in the ADS state, the ADS state being a state of observing a virtual environment by using a virtual scope equipped on the virtual firearm; and in response to receiving a touch operation signal, obtain a touch position of the touch operation signal and a distance between the touch position of the touch operation signal and a center position of the second fire button, determine that a trigger signal corresponding to the second fire button is received in response to the distance between the touch position of the touch operation signal and the center position of the second fire button being less than a second threshold, and control the virtual firearm held by the virtual object to hip fire in response to receiving the trigger signal corresponding to the second fire button.

12. A non-transitory computer-readable storage medium storing at least one instruction or program that is configured to be loaded and executed by a processor to implement the following method:

displaying a user interface (UI) comprising a first fire button configured as an operation control to trigger an aim down sights (ADS) and fire and a second fire button configured as an operation control to trigger hip fire, the second fire button being next to the first fire button;

in response to receiving a trigger signal corresponding to the first fire button, controlling a virtual firearm held by a virtual object to enter an ADS state, determining whether a fire condition is satisfied, and controlling the virtual firearm to shoot in response to the fire condition being satisfied and the virtual firearm being in the ADS state, wherein the ADS state is a state of observing a virtual environment by using a virtual scope for the virtual firearm; and in response to receiving a touch operation signal, obtaining a touch position of the touch operation signal and a distance between the touch position of the touch operation signal and a center position of the second fire button, determining that a trigger signal corresponding to the second fire button is received in response to the distance between the touch position of the touch operation signal and the center position of the second fire button being less than a second threshold, and controlling the virtual firearm held by the virtual object to hip fire in response to receiving the trigger signal corresponding to the second fire button.

13. The non-transitory computer-readable storage medium according to claim 12, wherein the fire condition comprises a first fire condition and a second fire condition, and wherein the determining whether the fire condition is satisfied further comprises:
   determining whether the virtual object satisfies the first fire condition;
   in response to the virtual object satisfying the first fire condition, detecting whether the virtual firearm satisfies the second fire condition; and
   in response to the virtual firearm satisfying the second fire condition, determining that the fire condition is satisfied.

14. The non-transitory computer-readable storage medium according to claim 13, wherein the determining whether the virtual object satisfies the first fire condition further comprises:
   obtaining state information of the virtual object; and
   detecting, according to the state information of the virtual object, whether the virtual object satisfies the first fire condition, wherein the first fire condition comprises at least one of the following: when the virtual object is alive, when the virtual object is not driving a vehicle, or when the virtual object is not in water.

15. The non-transitory computer-readable storage medium according to claim 13, wherein the detecting whether the virtual firearm satisfies the second fire condition further comprises:
   obtaining state information of the virtual firearm; and
   detecting, according to the state information of the virtual firearm, whether the virtual firearm satisfies the second fire condition, wherein the second fire condition comprises at least one of the following: when the virtual firearm has bullets left, or when the virtual firearm is not reloading bullets.

16. The non-transitory computer-readable storage medium according to claim 12, wherein the controlling the virtual firearm to shoot further comprises:
   controlling, in a duration of the trigger signal, the virtual firearm to perform a shooting operation every preset time interval.

17. The non-transitory computer-readable storage medium according to claim 12, further comprising:
   in response to a touch operation signal being received, obtaining a touch position of the touch operation signal;
   obtaining a distance between the touch position of the touch operation signal and a center position of the first fire button; and
   in response to the distance being less than a first threshold, determining that the trigger signal corresponding to the first fire button is received.

18. The non-transitory computer-readable storage medium according to claim 12, wherein after the controlling the virtual firearm held by the virtual object to enter an ADS state, further comprises:
   obtaining a touch position corresponding to the trigger signal in a duration of the trigger signal; and
   adjusting a shooting direction of the virtual firearm according to the touch position corresponding to the trigger signal.

* * * * *

UNITED STATES PATENT AND TRADEMARK OFFICE
CERTIFICATE OF CORRECTION

PATENT NO. : 12,090,389 B2  
APPLICATION NO. : 17/471980  
DATED : September 17, 2024  
INVENTOR(S) : Zhi Hong Liu and Jin Hao Yang It is certified that error appears in the above-identified patent and that said Letters Patent is hereby corrected as shown below:

In the Claims

In Claim 1, Column 14, Line 39, delete "including".

Signed and Sealed this
Twenty-second Day of July, 2025

Coke Morgan Stewart
*Acting Director of the United States Patent and Trademark Office*